Jan. 11, 1927. 1,613,843
H. C. MUMMERT ET AL
TAIL SKID
Filed August 26, 1925    2 Sheets-Sheet 1

INVENTORS
HARVEY C. MUMMERT.
AND JOSEPH F. MEADE.
BY
ATTORNEY

Jan. 11, 1927.  H. C. MUMMERT ET AL  1,613,843
TAIL SKID
Filed August 26, 1925    2 Sheets-Sheet 2

INVENTORS
HARVEY C. MUMMERT.
AND JOSEPH F. MEADE.
BY
ATTORNEY

Patented Jan. 11, 1927.

1,613,843

UNITED STATES PATENT OFFICE.

HARVEY C. MUMMERT AND JOSEPH F. MEADE, OF HAMMONDSPORT, NEW YORK, ASSIGNORS TO AERIAL SERVICE CORPORATION, A CORPORATION OF NEW YORK.

TAIL SKID.

Application filed August 26, 1925. Serial No. 52,488.

Our invention relates to tail skids for aeroplanes.

An object of the invention is to provide a tail skid which, tho wholy exposed, offers a minimum of resistance; which, tho exceedingly light, is nevertheless strong, and which, tho exceptionally compact, is nevertheless highly efficient.

A further object of the invention is to provide a tail skid which is accessible at all times and which, in effect at least, constitutes a rearward and downward prolongation of the aeroplane fuselage or body.

A still further object of the invention is to provide in connection with the tail skid, a brake shoe, said shoe being mounted at the free end of the tail skid, being normally inactive, and having associated with it appropriate mechanism whereby, should occasion demand, it (the brake shoe) may be released.

Other objects of the invention will be hereinafter pointed out.

In the drawings, wherein like reference characters denote like or corresponding parts, Fig. 1 is a side elevation of our improved tail skid showing its relation to the fuselage or body of an aeroplane;

Figure 5:
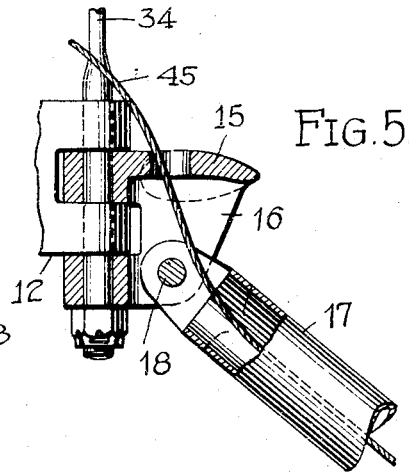
Fig. 5 is a detail sectional view of that portion of the skid in the vicinity of the connection between the skid bar and the aeroplane fuselage.

In the embodiment of the invention selected for illustration, 10 designates an enclosed aeroplane fuselage and 11 the rear end vertical frame member thereof. Said fuselage 10 at its extreme rear end is provided upon its exterior surface with a lower attachment fitting 12 and an upper attachment fitting 13, said two fittings being vertically aligned and bolted as at 14 to the vertical frame member 11 and to such other parts or portions of the fuselage frame work as lie closely adjacent thereto. The lower attachment fitting 12 has associated with it a lower tail skid fitting 15. This fitting 15 (see Fig. 5) is hollowed out as at 16 to receive in the hollowed out portion thereof the inner or upper end of a hollow skid bar 17. Said skid bar 17 is pivoted to the fitting 15 as indicated at 18, such pivotal axis being horizontally extended.

At the lower end of the skid bar 17 a heel member 19 is provided. Such heel member throughout the greater portion of its length is longitudinally slotted as indicated at 20, such slotted portion being curved upwardly and rearwardly to provide an appropriate anchorage for a brace member 21. Forwardly of its slotted portion, said heel member is barrel shaped as indicated at 22, the hollow end thus formed being adapted to receive the lower end of the skid bar 17, and since the skid bar 17 is hollow throughout, the hollow of the skid bar and the slot 20 of the heel member are in open communication. Bolts 23 are provided for fastening the heel member 19 in place.

Figure 4:
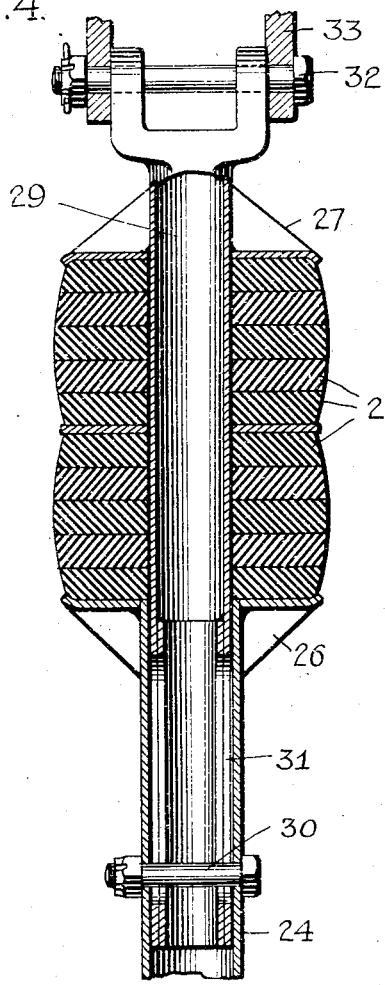
Fig. 4 is a detail vertical sectional view of the shock absorbing means.

The brace 21 (see Fig. 4) is made sectional. The lower section 24 of the brace 21 is pivoted as at 25 within the slot 20 of the heel member 19. At its upper end said brace section 24 is provided with an annular outwardly directed flange or abutment 26. Said abutment 26, in conjunction with an abutment 27 similarly formed on the upper section of the brace 21, constitutes a bearing surface for a superimposed tier of annular shock absorber discs 28. These discs 28 are preferably formed of rubber. They encircle the brace 21, and by reason of their engagement between the abutments 26 and 27, yieldingly resist relative movement of the sections comprising said brace. The upper brace section, upon which the abutment 27 is formed, is designated as 29. It (the section 29), enters the section 24, its movement with respect to said section 24 being guided by a bolt 30 penetrating both brace sections and a guide slot 31.

At its upper end the brace 21 is pivotally fastened as at 32 to a fitting 33 somewhat similar to the fitting 15 above referred to. The fitting 33 is the upper tail skid fitting whereas the fitting 15 is the lower, said fitting 15 being directly associated with the attachment fitting 12 and the fittitng 33 directly associated with the attachment fitting 13. Like said attachment fittings 12 and 13, the fittings 15 and 33 are also in vertical alignment. An elongated pivot pin 34, common to the total number of fittings, provides an axis, vertically extended about which the tail skid in its entirety is adapted to swing.

The skid bar 17 being pivoted as at 18 and the brace 21 being pivoted respectively as at 25 and 32, obviously vertical movement of the skid, yieldingly resisted at all times by the shock absorber discs 28, may take place, such movement as the discs are compressed causing the sections of the brace 21 to telescope.

As an emergency brake, the skid bar 17 has associated with it a brake shoe 35. Said shoe includes a ground engaging portion 36 and an upstanding portion 37, said upstanding portion being carried upwardly and into the slot 20 of the heel 19 where it is pivoted as at 38. Said upstanding portion 37 is further provided with an end notch 39 within which a lug 40 formed on the end of a sliding sleeve 41 confined to the hollow of the skid bar 17, is adapted to engage. Said sliding sleeve 41, like the brace section 29, is slotted as at 42, which slots, in conjunction with the bolts 23, guide the sleeve 41 in its sliding movement.

Figure 1:
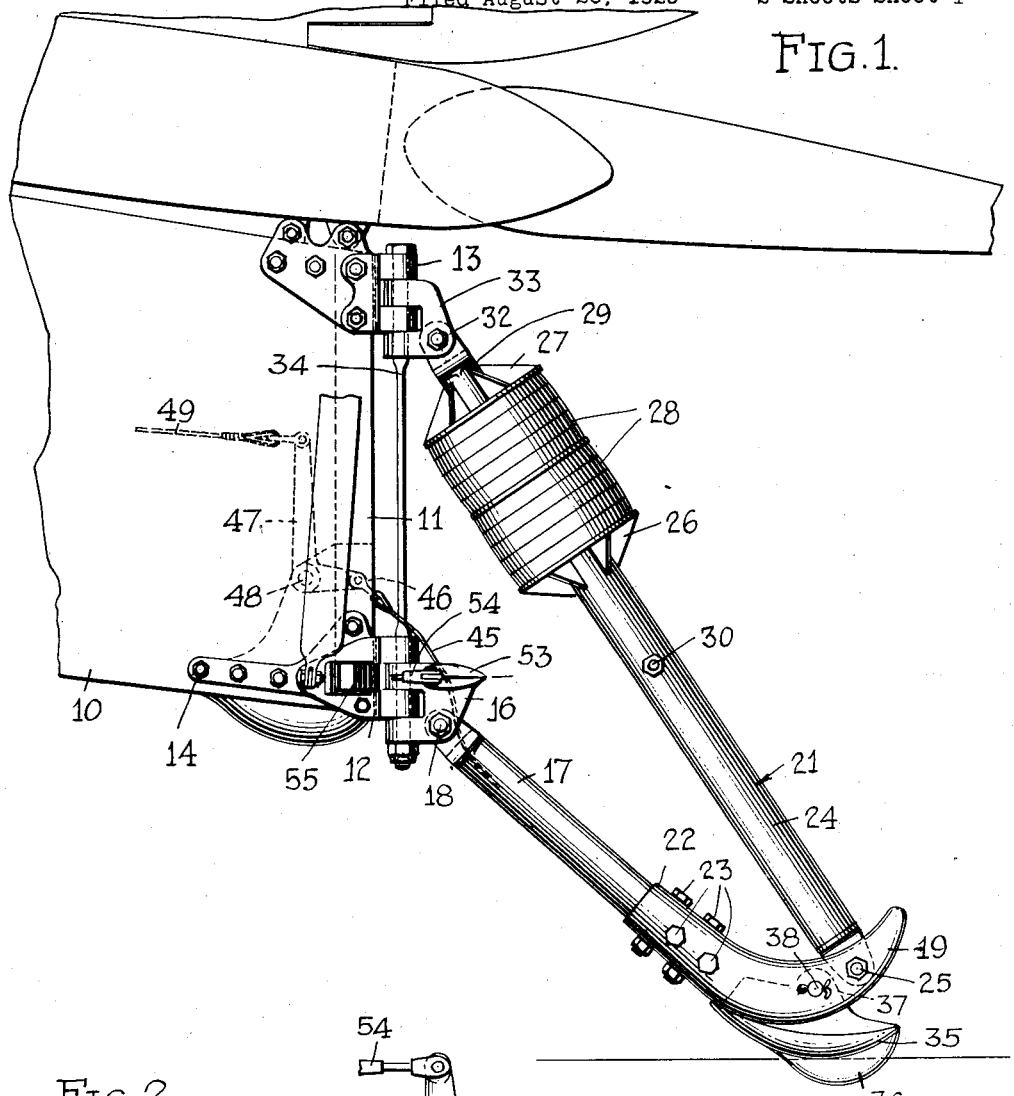
Figure 2:
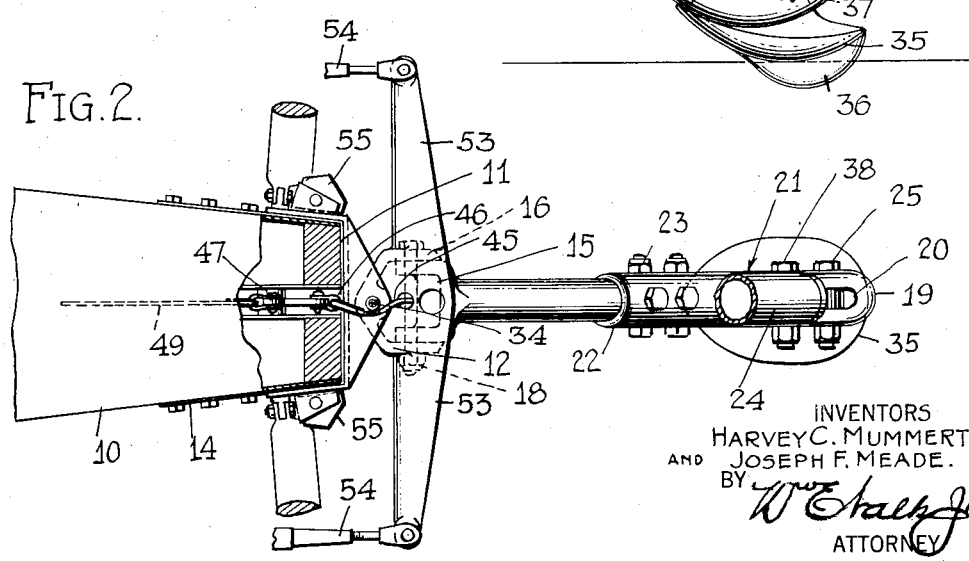
Fig. 2 is a plan view of the tail skid with a portion thereof, as well as a portion of the fuselage, partly broken away.
Figure 3:
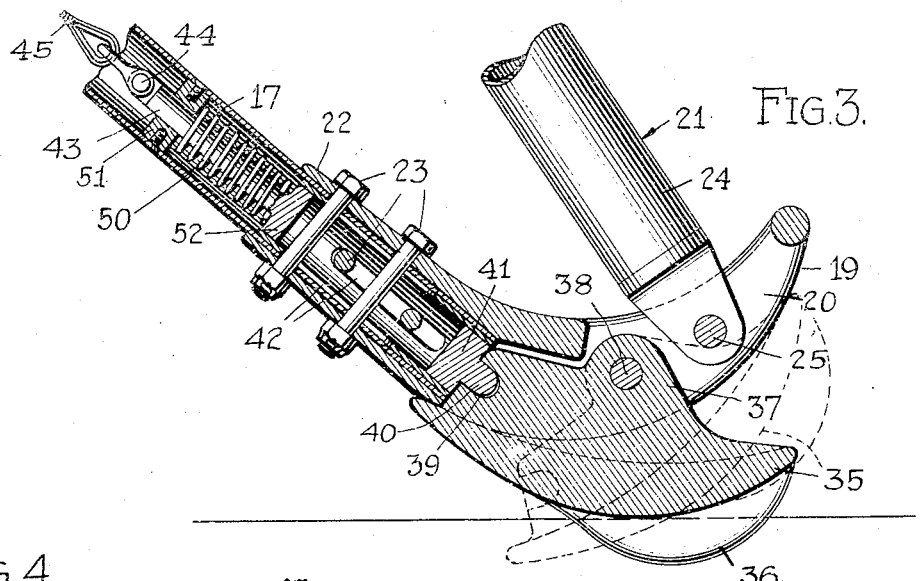
Fig. 3 is a longitudinal vertical sectional view of the ground engaging end of the skid.

At its inner or upper end said sleeve 41 is further provided with a rod 43 to which is attached, as at 44, an operating cable or cord 45. From the rod 43 the cord or cable 45 extends inwardly throughout the full length of the hollow skid bar to a point in the vicinity of the pivoted connection 18. From said point the cable 45 bends upwardly and thence forwardly, said cable at its inner upper end being fastened as at 46 to a bell crank 47 pivoted as at 48 within the fuselage. Said bell crank (see Fig. 1) is vertically disposed and has fastened to it, at its opposite end, an operating cord or cable 49.

Should occasion demand, by exerting a pull on the cable 49, which cable is carried forwardly within the fuselage to a point in the vicinity of the pilot's seat, the bell crank 47 is rocked, and the cord or cable 45 pulled upwardly sufficiently to withdraw the lug 40 from the notch 39. Such movement of the operating cord or cable, it will be noted, is against the action of a spring 50, spiraled about the rod 43 within the hollow skid bar 17, said spring at its opposite ends bearing respectively against an abutment 51 fixed within the skid bar and an abutment 52 which constitutes the upper inner end of the sliding sleeve 41. As the lug 40 is withdrawn from the notch 39, the brake shoe 35 is free to rock about its pivot 38, such rocking action of the brake shoe being induced by frictional contact between said shoe and the ground. As such rocking action takes place, the forward end of the shoe moves downwardly, and since the forward end is sharpened horizontally, obviously a biting action or digging in action takes place in the continued movement of the brake shoe along the ground.

We have further provided, for the purpose of steering, control arms 53. These arms extend laterally out from the fitting 15, each said arm being provided at its outer end with a control lead 54 which is carried forwardly to a point of convenient control. As a stop means limiting the swinging movement of the skid in a lateral direction, rubber blocks 55 are provided in horizontal alignment with the control arms 53 and at opposite sides of the fuselage.

A tail skid characterized as above set forth is at all times wholly accessible. It is inexpensive of manufacture, compact, and of extremely sturdy design. The emergency brake, tho normally inactive, is so related to the skid bar as to constitute the ground engaging portion of the skid. Thus organized, it is only necessary, in order that the brake shoe may dig in, as it were, for the tail skid to be dragged forwardly over the ground.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:

1. In a tail skid for aeroplanes, the combination, of an aeroplane fuselage, vertically spaced fittings fastened upon the exterior of said fuselage at the extreme rear end thereof, each said fitting comprising a fitting part fixed in its relation to said fuselage and a fitting part movable about a substantially vertical axis relatively thereto, a skid bar pivotally fastened to the movable part of the lower of said fittings, a sectional brace pivotally fastened at one end to the movable part of the other of said fittings and at its opposite end pivotally fastened to said skid bar, and means carried by said brace for yieldingly resisting relative movement of said brace sections.

2. In a steering tail skid for aeroplanes, the combination, of an aeroplane fuselage, vertically spaced fittings fastened upon the exterior of said fuselage, each said fitting comprising a fitting part fixed in its relation to said fuselage and a fitting part movable about a substantially vertical axis relatively thereto, arms projecting laterally out from one of said movable fitting parts, a skid bar pivotally fastened to the movable part of the lower of said fittings, a sectional brace pivotally fastened at one end to the movable part of the other of said fittings and at its opposite end pivotally fastened to said skid bar, means interposed between the brace sections for yieldingly resisting vertical movement of said skid, and steering connections fastened to said arms for laterally swinging said skid bar independently of its yielding vertical movement.

3. In a tail skid for aeroplanes, the combination, of an aeroplane fuselage, vertically spaced fittings fastened upon the exterior of said fuselage at the extreme rear end thereof, each said fitting comprising a fitting part fixed in its relation to said fuselage and a fitting part movable about a substantially vertical axis relatively thereto, a skid bar pivotally fastened to the movable part of the lower of said fittings, a brace comprising telescopic members pivotally fastened respectively to the movable part of the other of said fittings and to said skid bar, abutments formed one upon each said brace member, a tier of rubber discs carried by said brace and bearing at its opposite ends against said abutments to yieldingly resist vertical movement of said skid bar and means for swinging said skid bar and said brace laterally as a unit about said vertical axis independently of the yielding vertical movement aforesaid.

4. In an aeroplane tail skid, a hollow skid bar, a brake shoe mounted at the outer end of the skid bar, and mechanism enclosed in the hollow of the skid bar for holding the brake shoe normally inactive.

5. In an aeroplane tail skid, a hollow skid bar, a brake shoe pivotally mounted at the outer end of the skid bar, mechanism enclosed in the hollow of the skid bar for holding the brake shoe normally inactive, and means operable to release said holding mechanism.

6. In an aeroplane tail skid, a hollow skid bar, a brake shoe pivotally mounted at the outer end of the skid bar, mechanism enclosed in the hollow of the skid bar for holding the brake shoe normally inactive, and means operable from a point in the vicinity of the pilot's cockpit to release said holding means.

7. In an aeroplane tail skid, a hollow skid bar, a brake shoe pivotally mounted at the outer end of the skid bar, mechanism enclosed in the hollow of the skid bar for holding the brake shoe normally inactive, and means carried up thru the hollow skid bar and into the body of the aeroplane to release said holding mechanism.

8. In an aeroplane tail skid, a skid bar, a notched brake shoe pivotally mounted at the outer end of the skid bar, a lug engageable in said notch to normally render said brake shoe inactive, and mechanism operable to withdraw said lug to render the brake shoe active.

9. In an aeroplane tail skid, a skid bar provided with an outer slotted end, a pivotally mounted brake shoe having an upstanding portion engaging in said slot, and mechanism engaging said upstanding shoe portion to render the brake shoe normally inactive.

10. In an aeroplane tail skid, the hollow skid bar provided with an outer slotted end, a pivotally mounted brake shoe having an upstanding portion engaging in said slot, and mechanism enclosed in the hollow of said skid bar and engaging said upstanding shoe portion to normally render said brake shoe inactive.

In testimony whereof we hereunto affix our signatures.

HARVEY C. MUMMERT.
JOSEPH F. MEADE.